United States Patent
Sullivan et al.

[19]

[11] Patent Number: 5,831,540
[45] Date of Patent: Nov. 3, 1998

[54] CONTROL SYSTEM FOR LOADING DOCKS

[75] Inventors: Vincent Sullivan, Plano, Tex.; James C. Alexander, London, Canada

[73] Assignee: United Dominion Ind., Inc., Charlotte, N.C.

[21] Appl. No.: 505,962

[22] Filed: Jul. 24, 1995

[51] Int. Cl.[6] .................................................. G08B 21/00
[52] U.S. Cl. ........................ 340/679; 340/507; 340/521; 340/525; 340/526; 340/686; 364/143; 364/188
[58] Field of Search .................................. 340/686, 540, 340/542, 507, 585, 319.15, 525, 683, 685, 439, 958, 457.4, 526, 521; 701/29, 30; 364/141, 143, 188

[56] References Cited

U.S. PATENT DOCUMENTS

| | | | |
|---|---|---|---|
| 4,843,373 | 6/1989 | Trickle et al. | 340/540 |
| 5,047,748 | 9/1991 | Trickle | 340/542 |
| 5,168,267 | 12/1992 | Trickle | 340/686 |
| 5,424,720 | 6/1995 | Kirkpatrick | 340/585 |
| 5,459,963 | 10/1995 | Alexander | 49/34 |

*Primary Examiner*—Jeffery A. Hofsass
*Assistant Examiner*—Davetta Woods
*Attorney, Agent, or Firm*—Sughrue, Mion, Zinn, Macpeak & Seas, PLLC

[57] ABSTRACT

A system to determine the usage of loading dock equipment such as a dock leveler, a vehicle restraint and a barrier gate to provide an output indicative thereof. For each loading dock component mounted at a loading dock in an operable configuration whose operation is to be monitored, sensor outputs are used to provide data accumulated by PLC's located in a control panel associated with the loading dock. When operation of a piece of equipment is initiated the occurrence delivers an output signal to the PLC. A counting circuit accumulates a count of the output signals. The panel has displays in the form of lights and screens and the data maybe read out by means of a hand held unit for display and/or programing or delivered to a remote PC by appropriate cable.

20 Claims, 2 Drawing Sheets

CONTROL SYSTEM FOR LOADING DOCKS

BACKGROUND OF THE INVENTION

1. Field of the Invention

This invention is related to loading dock systems and in particular to a scheme for monitoring usage of components at a loading dock to determine maintenance schedules and to optimize usage for multiple dock installations.

2. Prior Art

The conventional loading dock employs a variety of equipment to facilitate the loading and unloading of trucks. Typical is a dock leveler installed in a pit or vertically stored and used to bridge the gap and the height differential between the loading dock floor and the truck bed. Additionally, recently mechanical vehicle restraints and dock barriers have become more prevalent. Restraints are used to secure the truck to the loading dock and prevent movement away from the dock while the barrier gate is employed to block the loading dock opening thus preventing fork lift trucks from accidently falling over the edge.

At multiple station loading docks the usage of equipment is not uniform, i.e. all stations not having substantially the same use. That is due to convenience, plant layout or the like and therefore some stations are in use more than others. Moreover, the equipment at the stations is also not uniformly employed. That is, at some stations mechanical vehicle restraints may be used all of the time while at others conventional wheel chocks are used due to the configuration of the trucks typically handled. Despite these variations in use, both throughout an installation and at a particular loading dock, all of these devices require periodic maintenance and inspection. Also, maintenance needs of the components vary with the type of equipment installed at a particular dock, for example, restraints requiring attention at a frequency different from that of a dock leveler.

While the prior art has recognized the need to monitor dock usage for purposes of promoting efficiency such as traffic and scheduling, there has been no recognition of the need to have a detailed component by component use history for purposes of preventive maintenance. The importance of this problem is underscored by the hazards associated with dock equipment and loading dock operations in general. Having well maintained equipment is essential. Typical of prior art management systems for scheduling are U.S. Pat. Nos. 4,843,373; 5,047,748 and 5,168,267. The concepts set forth in those patents are directed to monitoring dock usage as a whole as opposed to the operation of each piece of equipment. For example, the '267 patent keys off the vehicle restraint to determine the time a particular station (door) is empty or has a truck in position, i.e. dock status.

There exists however a more basic need to determine the status of the equipment in use so that dock usage can be made more uniform and maintenance schedules for the equipment at a particular multiple dock installation can be established and followed. This is a particular requirement for dock safety since the use of particular equipment beyond recommended maintenance cycles poses a hazard even though over equipment at the same station is operating within the schedule for that component.

SUMMARY OF INVENTION

Given the deficiencies in the prior art, it is an object of this invention to define a system that monitors operations of individual mechanical components at a loading dock to determine maintenance schedules and provide a appropriate outputs thereof.

In accordance with this invention, those loading dock components typically comprise, dock levelers, vehicle restraints, barrier gates, lift tables, doors, high speed and overhead and bridges.

It is another object of this invention to provide a system that has a matrix of data inputs indicative of component operation to a programmable logic control (PLC). The data could be accumulated at a particular dock control box and displayed, read out using hand-held unit for display and/or programming, or transmitted to a central data collection point, i.e. a PC. A typical output at the dock could simply be a series of illuminated buttons indicating the status of each component and warning of the need for maintenance of any one of them. Additionally, the time of actual usage and of particular operations can be stored and output. Given the flexibility in data handling, information from a number of docks could be accumulated and displayed at a common point, using a single display that scrolls through data from a number of different docks.

Yet another object of this invention is to monitor the proper and safe usage of dock equipment. That is, the operations of certain devices such as hydraulic levelers requires a correct sequencing for proper operation. An example is the storage of the hydraulic leveler prior to the truck departing the dock. The operating data from that component may be monitored to determine whether the sequence of operation is correct by inter-relating the vehicle restraint operation (thereby indicating release of the vehicle) before proper storage of the leveler. Consequently this invention permits the evaluation of proper use of dock equipment in addition to cycles of use of individual components.

This invention will be described in greater detail by referring to the attached drawing and the description of the preferred embodiment that follows.

DESCRIPTION OF THE PREFERRED EMBODIMENT

Figure 1:
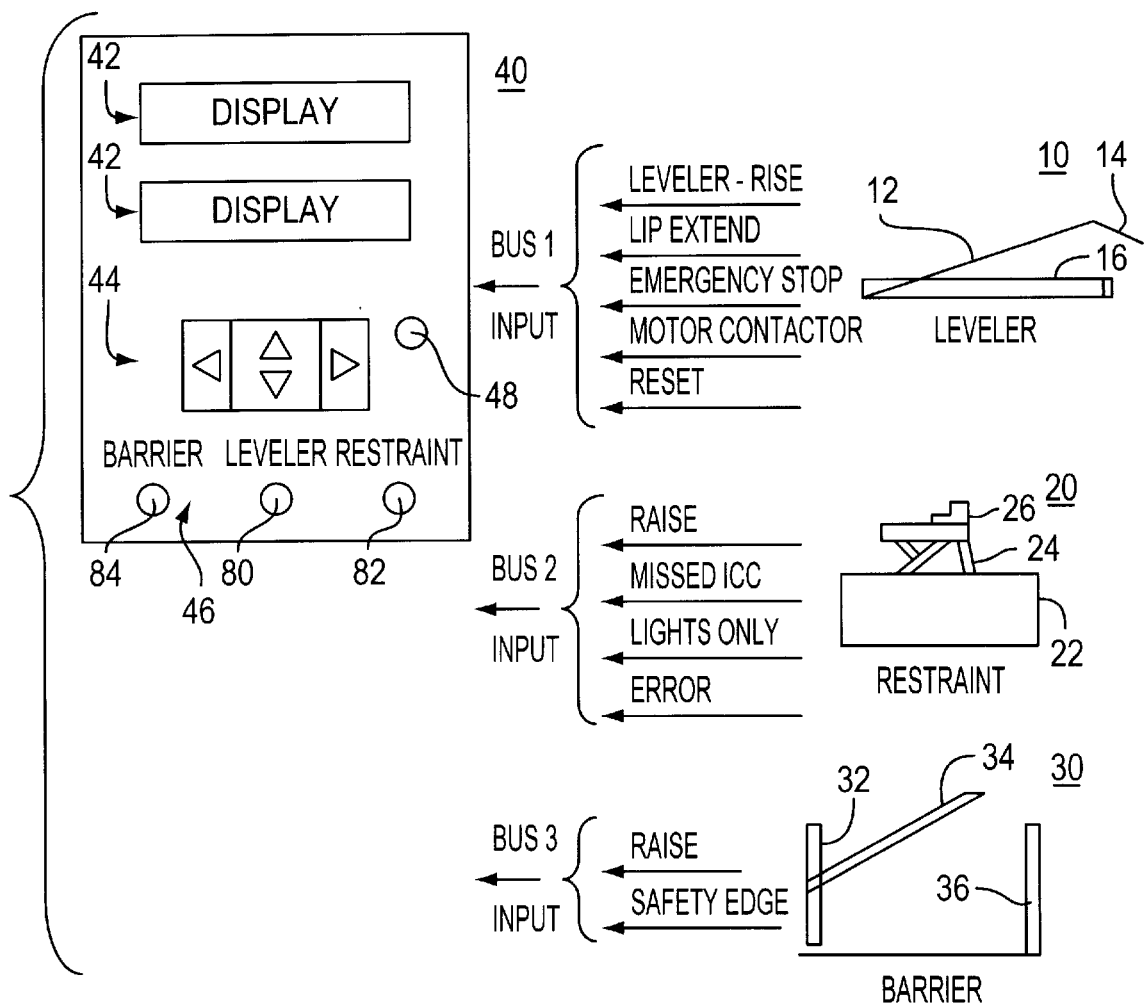
FIG. 1 is a schematic flow diagram illustrating the components being monitored and the data flow to the system.
Figure 2:
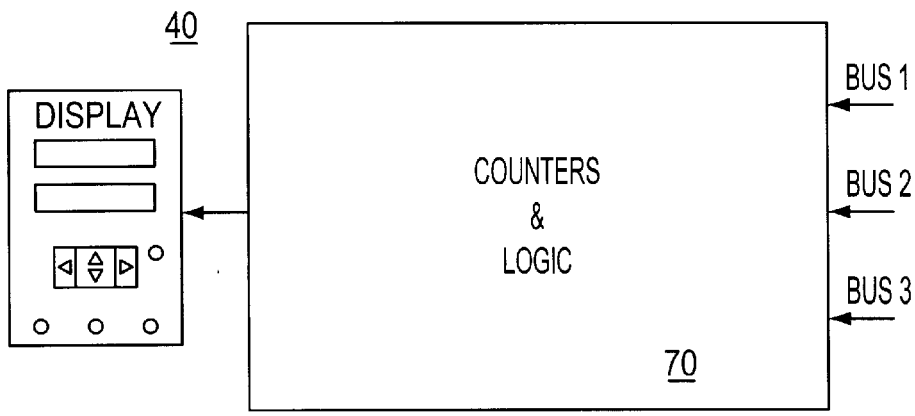
FIG. 2 is a schematic illustrating the data flow within the monitoring portion of the system.

Referring now to FIGS. 1 and 2 the preferred embodiment of this invention will be described. It will be understood that the dock components are illustrated in a high level format for purposes of identification only. Alternative component may be employed and other elements may be substituted for those described herein. The dock leveler 10 has a deck 12, lip 14 and a frame 16. It may be a pit or vertically stored unit. These devices are commercially available such as the Serco FCH series. Likewise, the restraint 20 may be a Serco VR series or other type of mechanical vehicle restraint. The restraint typically has a housing 22, an extending member 24 and a vehicle engaging member 26. Finally, the barrier 30 has a standard 32 housing a motor and mounting the gate 34 with a support 36 located on the opposite side of the door from standard 32.

It will be appreciated that other dock components may be monitored such as lift tables, bridges, mechanical doors and air seals. Thus, while three components are described in detail in this preferred embodiment, a different mix of dock equipment may be employed within the parameters of this invention. In accordance with this invention the dock equipment itself may be completely mechanical so long as the operations can be sensed and an electrical signal sent to the controller.

The panel 40 has a multi-line display 42, a multi-key cursor pad 44 and a series of display indicator lights 46. An internal PLC employs in this embodiment 11 inputs to monitor the operation and activity of each of the components. The panel 40 contains the programmable logic control used for both data collection and analysis. The specific inputs to the PLC from the leveler are: (1) leveler raise, (2) lip extend, (3) emergency stop, (4) motor starter relay and (5) reset switch (with key). Each of these operations are conventional modes of leveler use and appropriate sensors/switches (not illustrated) at the leveler or its control unit serve as inputs to the PLC. These inputs may be grouped on a first data bus to the PLC or, delivered discretely to the PLC, i.e. a separate input for each output from the leveler.

The PLC counts the activation occurrences of each input which exceeded a preset time, i.e. 6 seconds, to prevent counting multiple button presses. Internal timers also count elapsed system time (in days), motor running time, electric valve (for E-stop) engagement time. ARTD (Automatic return to dock) operations are determined by motor running without a button being pushed. All counters and timers are duplicated to provide information for Total (since installation) and Recent (since last reset). The reset switch sets the Recent registers to zero, but cannot alter the Total registers.

The inputs from the vehicle restraint 20 to the PLC include (1) raise, (2) ICC bar engaged, (3) lights only and (4) error mode. As in the case of the leveler, the sensor inputs may be derived directly from the motions of the device or keyed from the activation switches and buttons associated with restraint use. These inputs may be grouped on a second data bus 2 to the PLC or may be provided to the PLC as discrete signals.

The inputs from the barrier gate 30 to the PLC include (1) raise and (2) safety edge operations. These inputs are grouped on to a third data bus 3 to the PLC or, may be provided as discrete signals. As in the case of the leveler, all of the operations of the barrier gate are initiated at the dock and appropriate sensors are employed to provide the necessary input to the PLC.

Figure 3:
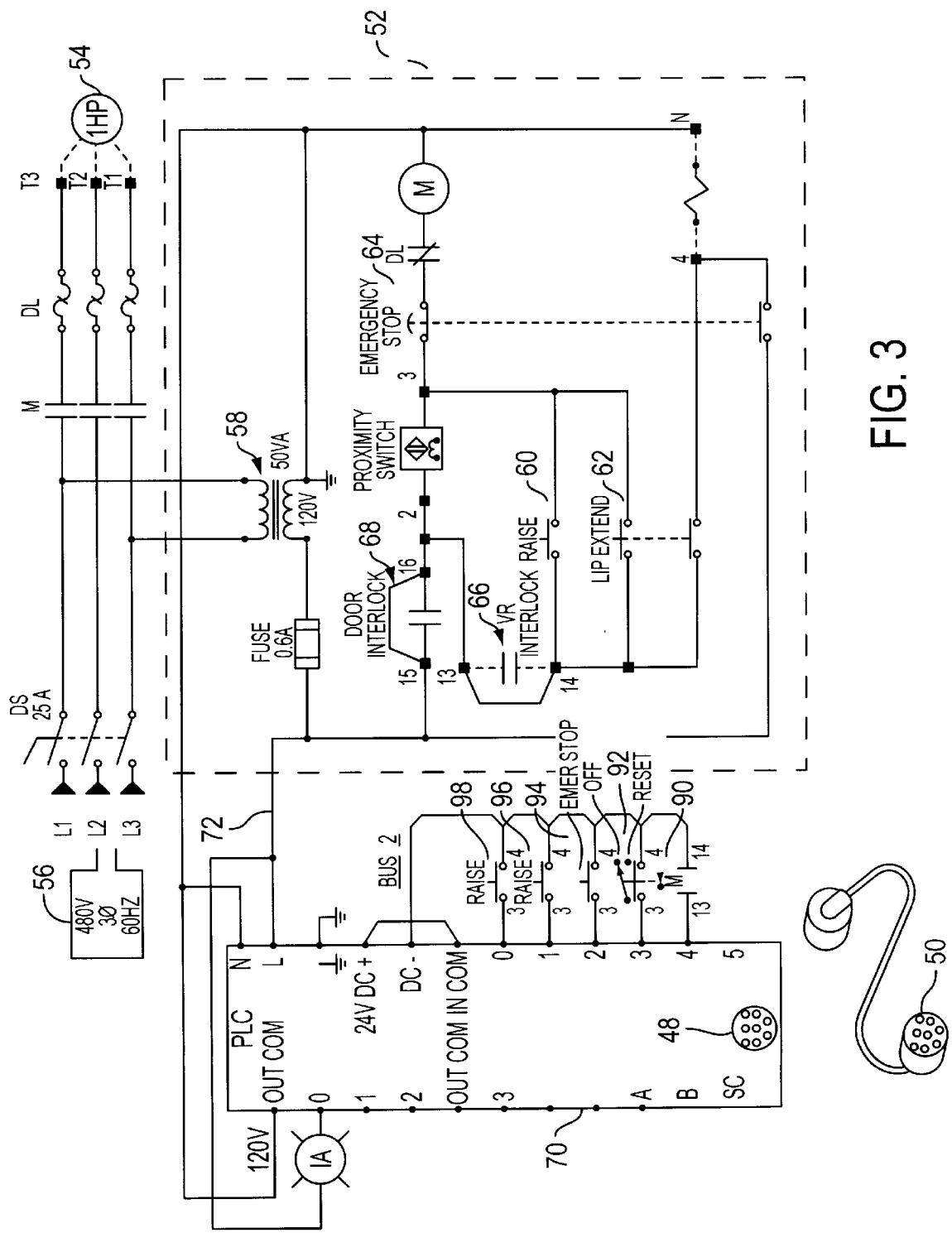
FIG. 3 is a circuit diagram of the basic components of a portion of the electrical system of this invention used to monitor dock leveler operation.

Additionally, other inputs can be provided to allow the preset number of operations or elapsed time to be changed for various applications. FIG. 3 illustrates how the inputs from the leveler are connected to the PLC.

The switches employed to activate the leveler are defined in the box 52, representative of the control panel for that dock component. Input power for the leveler motor 54 is typically taken from a three phase source 480 V, 60 Hz 56 which is split into 120 V and delivered to the control panel via the transformer 58. It may also be a 120 V single phase line. The leveler control panel typically has a deck raise button 60, a lip extend button 62, and an emergency stop button 64. These controls may be interlocked to other equipment to insure operation in a predetermined sequence. For example, operation of the leveler 10 can be interlocked to the restraint 20 via the interlock 66 so that leveler operation cannot occur until the vehicle is restrained at the dock by the restraint 20. Similarly the operation of the leveler can be sequenced to the opening of the loading dock door via interlock 68.

The PLC 70 power input on line 72 is fused in a conventional manner. Bus 2 inputs are illustrated at PLC data inputs 0–4. These inputs represent the sensor inputs from the various switches used to operate the leveler. The switches 90–98, as illustrated in FIG. 3 provide the incremental count data to the PLC for various operations including initiation of Motor (M) operation. The other inputs are from the keyboard 44. The display 42 forms one output, another at serial port 48 and a third the warning lights 80–84. The serial port may be accessed by a hand held reader, not illustrated or be connected to a remote PC for direct data transfer.

Inputs to the PLC 70 from the other data buses 1 and 3 utilizing the respective inputs from the restraint and the gate would be accomplished in the same manner as those from the leveler. Usage is tracked by the PLC 70 by counting occurrences of various operations from the bus inputs. When stored predetermined values have been exceeded, for example a number of deck raise operations, a light 80 illuminates indicating that this component is in need of preventative maintenance. Lights 82 and 84 operate in a similar manner for the restraint and the gate. By the use of the input keyboard, these accumulated counts may be interrogated and displayed.

As set forth herein, the inputs to the PLC, which has a number of discrete input points, can be by directly coupling the input to a sensor output associated with a particular component. Data buses may then be eliminated. Moreover, given the mix of dock equipment being monitored, a variety of sensors may be used such as limit switches, contact closures, relays or other sensors.

The outputs may vary depending on configuration. For example, FIG. 1 illustrates a series of indicator lights 46 on the panel face which are illuminated after a preset time or number of operations has been exceeded. These lights are activated by the PLC. Additional output capability is obtained by use of an LCD alpha-numeric display 42 of the stored information without the need for an external programmer or readout device. It is within the scope of this invention to use the lights 46 and the display 42 independently of each other. FIG. 1 illustrates an LCD display, preferably having two lines of 40 characters, and a 4-key cursor touch pad 44. This would allow the operator to display information such as:

DOCK LEVELER OPERATIONS

Recent use=21 days Total use=435 days in a line format for direct readout of the parameters for the selected device. The total amount of information is represented as a two dimensional matrix where the display is a small window into a large table of information, much like a computer screen with a large spreadsheet. For example, scrolling left or right would display the column headers representing each device, such as dock leveler, vehicle restraint, barrier gate, door, etc. The up and down cursors would scroll through the information pertinent to that device to display operations, operating time, etc. The use of such display techniques per se is well known and this one of working skill could implement the display portion by the use of standard commercially available components once the data from the PLC is output in a suitable table compatible with the display capabilities of the screens 42.

Alternatively another configuration would include the above plus a 12 or 16 button keypad to input information. This would be used primarily as a security system for the restraint 30, but could be expanded for many other functions. Additionally, retrieval of the stored information is through a serial cable 50 from the PLC in the display 40 to a hand-held unit for display and/or programing (not illustrated) can be carried out if the data is to be collected at stored at a remote location. The data could also be hard-wired into a central collection point such as a PC. The PC could be located remote form the dock and serve as a the central data collection and dissemination point for the entire operation having a number of loading docks.

It will be apparent that this invention is not restricted to a particular form of display and that one of working skill will adapt the display to the degree of sophistication required for a particular installation. For example, one display could serve a number of different docks. The data would be tied into that display allowing the operator to scroll to the appropriate dock and pull data for that installation. This technique would save on the number of displays located at the dock.

In accordance with one configuration of this invention the module 40 is an independent device operating in parallel with the existing control panel for each of the dock devices 10, 20, and 30. Thus it is an add on to any control panel configuration. It would be a package which would be mounted inside the front cover of the control panel for that particular dock installation. A new front cover would be used for the 2-line display 42 and the 4-key cursor pad 44. The software would be configured to display data as described above. That is, the operator would scroll left or right to the specific device (dock, restraint, barrier, etc.) and up or down for the specific data for that device. The panel of this invention provides versatility in operation as the use of a numeric keypad (not illustrated) could be combined with the numeric display to provide a number of functions. For example, output contacts could control the operation of all the devices by requiring a pass code number sequence before critical operations such as opening the loading dock door, releasing the restraint, switching to "lights only", etc.

The system would be reset by use of security key so that the warning lights 80–84 would return to a green condition and the counters reset to zero. Obviously, the PLC would retain total accumulated use data but would be re-sequenced for a particular operation cycle of a particular loading dock component being monitoring.

It is apparent that while the combination of leveler, restraint and barrier have been described any combination of these devices may be present at a particular dock and thus, this invention is not limited to the specific grouping of elements illustrated. As set forth herein a variety of different components may be matched into a composite system.

Also, since at particular installations the docks are not used equally, this invention permits maintenance cycles to be monitored for each dock and for each piece of equipment at the dock. When the data read out or the warning light is illuminated that particular component can be serviced while use is shifted to another dock. In extreme situations, equipment can be swapped around so that overall aging is made more uniform. This in turn allows replacement cycles for dock loading equipment to be managed.

Moreover, given the mix of equipment, the proper sequencing of operations may be monitored. For example, hydraulic levelers, if operated in a safe and proper manner, require proper storage before the vehicle is allowed to depart from the dock. The use of the auto return sequence is not proper but commonly used. By this invention the sequencing of equipment may be monitored to determine whether it is being correctly used. If the vehicle restraint is actuated to release the vehicle before the hydraulic leveler is stored, records of such occurrences can be kept to provide trends at particular docks of proper and improper operation of equipment. This is an important safety consideration because it targets actual practices which require education to eliminate and promote dock safety.

It is apparent that modifications of this invention may be practiced without departing from the scope thereof.

We claim:

1. A system for monitoring operating use of dock loading equipment comprising:

a plurality of different dock loading components installed for use at a loading dock, each of said dock loading components at said loading dock having at least one mode of operation thereof, a sensor responsive to said mode of operation for each of said plurality of dock loading components to produce a signal indicative that the operation has occurred for said component, means to count said signals for each of said components, and generate an output indicative of said count.

2. The system of claim 1 wherein said output is an alarm signal indicative that said count has exceeded a predetermined value.

3. The system of claim 1 wherein said output is a display providing data of usage of said loading dock equipment.

4. The system of claim 1 further comprising an output port and wherein said output is provided as data to a terminal.

5. The system of claim 1 wherein said plurality of different loading dock components comprises a dock leveler.

6. The system of claim 1 wherein said plurality of different loading dock components comprises a mechanical vehicle restraint.

7. The system of claim 1 wherein said plurality of different loading dock components comprises a barrier gate.

8. The system of claim 1 wherein said plurality of different loading dock components comprises a combination of equipment including a dock leveler, a vehicle restraint and/or a barrier gate.

9. The system of claim 1 further comprising a control panel for said loading dock component, said control panel having a circuit to accumulate said count and compare values thereof with predetermined amounts and provide an output indicative of whether said loading dock component has in service exceeded said predetermined amount, said control panel having a display to output stored data in said circuit and a keyboard to access said circuit.

10. The system of claim 9 wherein said circuit comprises a programmable logic circuit associated with each loading dock component being monitored.

11. A system to determine the usage of loading dock equipment and provide an output indicative of maintenance requirements comprising;

a loading dock component mounted at a loading dock in an operable configuration, a control panel for said loading dock equipment, said control panel having actuators to initiate operation of said loading dock component, means associated with said actuators to determine when an operation of said loading dock component has occurred and to deliver an output signal, a counting circuit to accumulate a count of said output signals indicative of the number of times said loading dock component has performed said operation, and a display to provide a visual indication of said count to determine maintenance requirements for said component.

12. The system of claim 11 wherein said display is an alarm signal indicative that said count has exceeded a predetermined value.

13. The system of claim 11 wherein said display is a display panel providing lines of data of usage of said loading dock equipment.

14. The system of claim 11 further comprising an output port accessible by a terminal.

15. The system of claim 11 wherein said loading dock component comprises a dock leveler.

16. The system of claim 11 wherein said loading dock component comprises a mechanical vehicle restraint.

17. The system of claim 11 wherein said loading dock component comprises a barrier gate.

18. The system of claim 11 wherein said loading dock component comprises a combination of equipment including a dock leveler, a vehicle restraint and/or a barrier gate.

19. The system of claim 11 wherein said control panel includes a circuit to accumulate said count and compare values thereof with predetermined amounts and wherein said display is mounted on said control panel and is indicative of whether said loading dock component has in service exceeded said predetermined amount, said control panel further having a screen to display stored data in said circuit and a keyboard to access said circuit.

20. The system of claim 19 wherein said circuit comprises a programmable logic circuit associated with each loading dock component being monitored.

* * * * *